(12) United States Patent
Okoshi et al.

(10) Patent No.: US 7,722,195 B2
(45) Date of Patent: May 25, 2010

(54) PROJECTOR WITH A DETACHABLY ATTACHING LAMP COVER

(75) Inventors: Masayuki Okoshi, Matsumoto (JP); Toshimitsu Watanabe, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 490 days.

(21) Appl. No.: 11/445,150

(22) Filed: Jun. 2, 2006

(65) Prior Publication Data
US 2006/0279715 A1 Dec. 14, 2006

(30) Foreign Application Priority Data
Jun. 8, 2005 (JP) ............................. 2005-168438

(51) Int. Cl.
G03B 21/14 (2006.01)
G03B 21/20 (2006.01)
G03B 21/22 (2006.01)
E05B 65/00 (2006.01)

(52) U.S. Cl. .............................. 353/119; 353/87; 70/57; 70/77; 70/158

(58) Field of Classification Search ................. 353/119, 353/122, 72–73, 85, 87; 49/371–373, 379–386; 70/57, 77, 158
See application file for complete search history.

(56) References Cited

U.S. PATENT DOCUMENTS

| 2,193,416 | A | * | 3/1940 | Friestedt | 49/35 |
| 5,924,782 | A | * | 7/1999 | Park | 312/328 |
| 6,659,516 | B2 | * | 12/2003 | Wang et al. | 292/251.5 |
| 6,755,541 | B2 | * | 6/2004 | Nakano et al. | 353/119 |
| 6,786,353 | B2 | * | 9/2004 | Gourand | 220/835 |
| 7,156,526 | B2 | * | 1/2007 | Tanaka | 353/119 |
| 7,216,459 | B1 | * | 5/2007 | Akkala et al. | 52/20 |

FOREIGN PATENT DOCUMENTS

| CN | 1387083 A | 12/2002 |
| JP | A-8-131240 | 5/1996 |
| JP | A-2003-43583 | 2/2003 |

* cited by examiner

*Primary Examiner*—Georgia Y Epps
*Assistant Examiner*—Jori S Byrne-Diakun
(74) *Attorney, Agent, or Firm*—Oliff & Berridge, PLC

(57) ABSTRACT

A projector includes a light source device and an exterior casing, wherein an engagement moving portion slant surface is formed at an engagement moving portion, the engagement moving portion slant surface abutting on an engaging protrusion in a sliding manner when the engagement moving portion is moved to a not-engaging position to press the engaging protrusion toward a top portion.

5 Claims, 11 Drawing Sheets

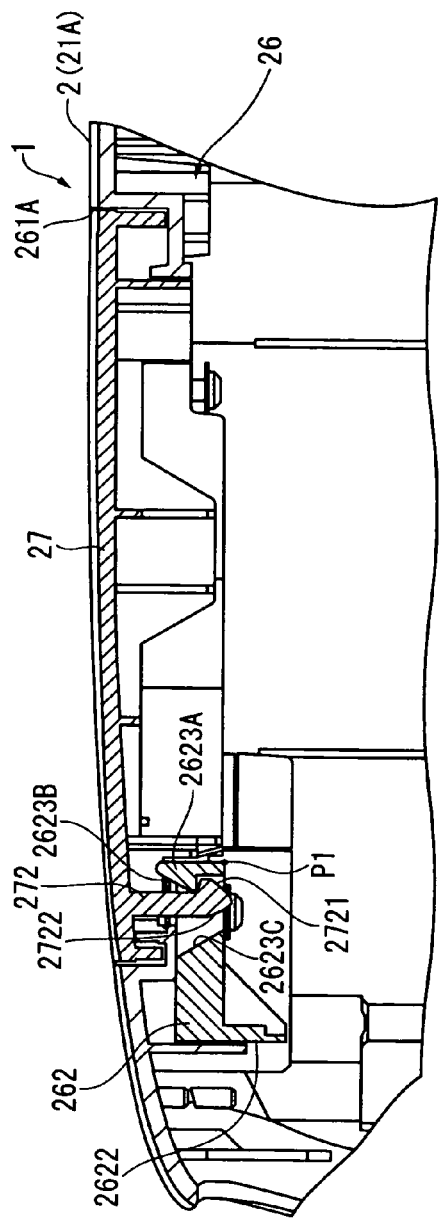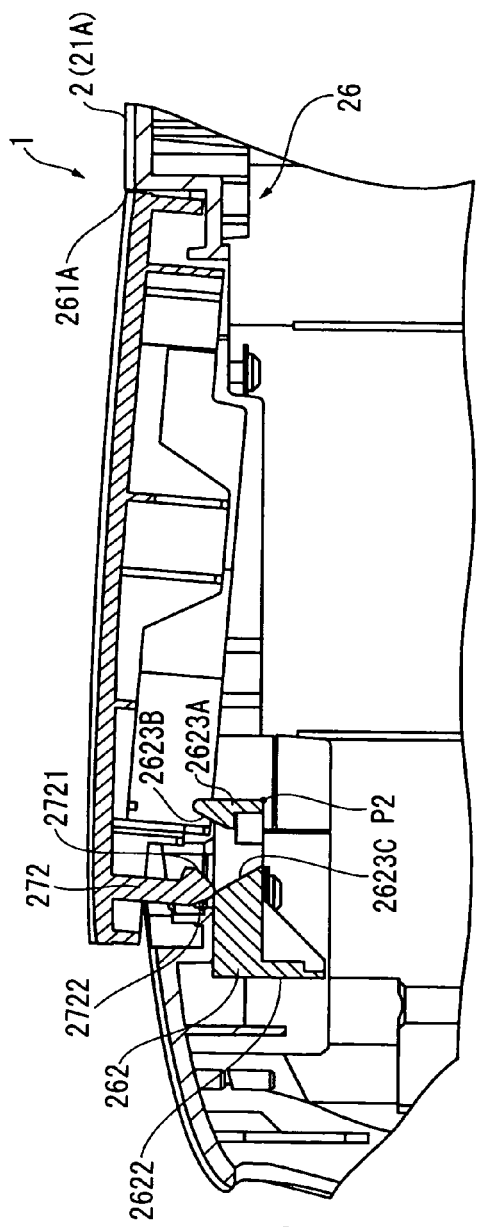

PROJECTOR WITH A DETACHABLY ATTACHING LAMP COVER

The entire disclosure of Japanese Patent Application No. 2005-168438, filed Jun. 8, 2005, is expressly incorporated by reference herein.

BACKGROUND

1. Technical Field

The present invention relates to a projector.

2. Related Art

There has been known a projector that includes a light source device and an exterior casing for housing the light source device and modulates a light beam irradiated by the light source device to project the light beam in an enlarged manner.

Such projector has a structure in which an opening is formed in the exterior casing at a position corresponding to a position of the light source device so that the light source device can be removed and replaced at the end of its life or in other case, the opening being covered with a lamp cover (lid), and the lamp cover being detachably attached to the exterior casing (for example, see Document 1: JP-A-2003-43583).

According to the projector described in Document 1, attached on the exterior casing are a lock lever movable by engaging with a second engaging portion formed at the lamp cover; a first biasing member for biasing the lamp cover so as to disengage the second engaging portion from the lock lever; and a second biasing member for biasing the lamp cover so as to keep holding a holder that holds the lamp cover relative to the exterior casing in a slightly opened manner when the second engaging portion and the lock lever are disengaged from each other. With the above-described structure, the light source device can easily be replaced.

However, in the projector described in Document 1, the lock lever, the first biasing member, the second biasing member, and the like need to be attached relative to the exterior casing, so that manufacturing of the projector is likely complicated. Therefore, a technique for attaching/detaching the lamp cover relative to the exterior casing easily with a simple structure is desired.

SUMMARY

An object of the invention is to provide a projector that can realize attachment/detachment of a lid relative to an exterior casing easily with a simple structure.

A projector according to an aspect of the invention includes: a light source device; and an exterior casing for housing the light source device. The projector modulates a light beam irradiated by the light source device to project the light beam in an enlarged manner. The exterior casing includes: a top portion; a top opening formed in the top portion at a position corresponding to a position of the light source device; a lid capable of closing the top opening; a lid opening/closing portion for detachably attaching the lid relative to the top portion; and an engaging protrusion formed at the lid, the engaging protrusion projecting to an inside of the exterior casing via the top opening with the lid attached relative to the top opening. The lid opening/closing portion includes an engagement moving portion attached on a back surface of the top portion, the engagement moving portion having an engaging portion to be engaged with the engaging protrusion and being movable between an engaging position where the engaging portion engages with the engaging protrusion and a not-engaging position where the engaging portion does not engage with the engaging protrusion. Also, an engagement moving portion slant surface is formed at the engagement moving portion, the engagement moving portion slant surface abutting on the engaging protrusion in a sliding manner when the engagement moving portion is moved to the not-engaging position, and being slanted in a direction opposite to a moving direction to the not-engaging position as the engagement moving portion slant surface shifting to a top portion side relative to a plane orthogonal to the moving direction.

The engagement moving portion is only required to be movable between the engaging position and the not-engaging position, so that a movement structure may be sliding, rotating, or the like.

With this configuration, the lid is attached to/detached from the top portion (lid opening/closing portion) by moving the engagement moving portion to the engaging position and the not-engaging position. Owing to this, the attachment of the engagement moving portion to the exterior casing alone allows the lid to be attached to/detached from the exterior casing, thus facilitating the structure.

Also, the engagement moving portion slant surface is formed at the engagement moving portion, the engagement moving portion slant surface being slanted in the direction opposite to the moving direction of the engagement moving portion when being moved to the not-engaging position as the engagement moving portion slant surface shifting to the top portion side relative to the plane orthogonal to the moving direction. Accordingly, when the engagement moving portion is moved to the not-engaging position, the engagement moving portion slant surface is abutted on the engaging protrusion of the lid in a sliding manner to press the engaging protrusion of the lid toward the top portion side, so that the lid can be lifted up. Owing to this, one member, i.e., the engagement moving portion alone realizes a structure by which the lid is disengaged from the exterior casing (engaging portion) and the lid is lifted up.

Hence, the attachment/detachment of the lid relative to the exterior casing can be realized easily with a simple structure, thereby attaining the object of the invention.

Preferably, in the above-described the projector, a protrusion slant surface may be formed at the engaging protrusion, the protrusion slant surface abutting on the engagement moving portion slant surface in a sliding manner corresponding to the engagement moving portion slant surface.

With this arrangement, since the protrusion slant surface corresponding to the engagement moving portion slant surface is formed even at the engaging protrusion, the protrusion slant surface can be abutted on the engagement moving portion slant surface in a sliding manner when the engagement moving portion is moved to the not-engaging position, thus smoothly performing the movement of the engagement moving portion. Accordingly, the detachment of the lid relative to the exterior casing can smoothly be performed.

Preferably, in the above-described projector, the lid opening/closing portion may be disposed between the top portion and the engagement moving portion, and have a biasing member for biasing the engagement moving portion toward an engaging position side.

With this arrangement, since the lid opening/closing portion has the biasing member for biasing the engagement moving portion toward the engaging position side, the engagement moving portion may continuously be biased toward the engaging position side. Accordingly, since the biasing member enforces the movement of the engagement moving portion toward the engaging position side out of the two-way movement thereof toward the engaging position side and toward the not-engaging position side, the movement toward the not-engaging position side is only required to be performed manually. Thus, when the lid is attached to/detached from the exterior casing, the movement toward the not-engaging position side is only required to be performed manually out of the two-way movement of the engagement moving portion, thereby facilitating the attachment/detachment of the lid.

Preferably, in the above-described projector, the engagement moving portion may have an engagement moving portion body which is a plate substantially parallel to the top portion, and a pressing portion standing on a plate surface of the engagement moving portion body and being substantially orthogonal to the moving direction of the engagement moving portion, and an operation hole to move the engagement moving portion to the not-engaging position may be formed in a lateral portion intersecting with the top portion of the exterior casing at a position planarly interfering with the pressing portion.

With this arrangement, the pressing portion is formed at the engagement moving portion whereas the operation hole is formed in the lateral portion intersecting with the top portion of the exterior casing. Accordingly, by inserting a rod member such as a screwdriver to the inside of the exterior casing from the outside of the exterior casing via the operation hole, and by pressing the pressing portion with a tip end of the rod member, the engagement moving portion can easily be moved to the not-engaging position.

Further, since the operation hole is formed in the lateral portion intersecting with the top portion, when compared to a configuration where an operation hole is formed in a top portion for instance, an amount of a light leaked from the light source device to the outside of the projector via the operation hole when the projector is driven can be reduced. Hence, an influence on a projection image due to the leaked light can also be restricted, thus providing good viewing of the projection image for a viewer.

Preferably, in the above-described projector, the lid opening/closing portion may have a base formed on a peripheral edge of the top opening of the top portion for attaching the engagement moving portion thereto. A first rib may be formed on the base, the first rib being a frame in plan view and protruding in a direction substantially orthogonal to the top portion. A second rib may be formed on a back surface of the lid, the second rib being a frame in plan view, protruding in a direction substantially orthogonal to the lid, and fitting to the first rib with the lid attached relative to the top portion. Also, a hold structure may be formed at each of the first rib and the second rib for holding a moving position of the lid relative to the top portion with the engagement moving portion positioned at the not-engaging position.

With this arrangement, with the lid attached relative to the top portion, the first rib being a frame in plan view of the lid opening/closing portion is fitted to the second rib being a frame in plan view of the lid. Accordingly, the first rib and the second rib realize a structure that shuts the leaked light from the light source device when the projector is driven, so that the amount of the leaked light to the outside of the projector via the top opening can be reduced. Hence, the influence on the projection image due to the leaked light can also be restricted, thus providing good viewing of the projection image for a viewer.

Also, since a hold structure is formed on each of the first rib and the second rib, a state where the engagement moving portion is positioned at the not-engaging position and the lid is slightly opened relative to the top portion can be kept by the hold structure. Therefore, when the projector is in a suspended posture (for example, a state where a bottom surface of the projector is attached to an installation surface such as a ceiling), for moving the engagement moving portion to the not-engaging position and detaching the lid relative to the top portion, the lid will not be dropped and the detachment of the lid can preferably be performed.

Further, since the hold structure is formed at each of the first rib and the second rib, the leaked light can be shut due to the first rib and the second rib as described above, for instance when compared to a configuration where the hold structure is formed at other position, the amount of the leaked light to the outside of the projector via the hold structure (such as a recess or a hole) can be reduced.

Preferably, in the above-described projector, the lid opening/closing portion may have a base formed on a peripheral edge of the top opening of the top portion for attaching the engagement moving portion thereto. The base may include a first upright portion being a frame in plan view and protruding from a peripheral edge of the top opening to an inside of the exterior casing, and a step connecting to the first upright portion, planarly covering the top opening and extending substantially parallel to the top portion. The step may have a stepped opening formed at a position corresponding to a position of the light source device and having an opening area smaller than an opening area of the top opening, and a first rib being a frame in plan view, protruding to an outside of the exterior casing, and covering the stepped opening. Also, a second upright portion and a second rib each being a frame in plan view may be formed on the back surface of the lid, the second upright portion and the second rib protruding in a direction substantially orthogonal to the lid and respectively fitting to the first upright portion and the first rib with the lid attached relative to the top portion.

With this arrangement, with the lid is attached relative to the top portion, the first upright portion and the first rib each being a frame in plan view of the lid opening/closing portion are respectively fitted to the second upright portion and the second rib each being a frame in plan view of the lid. Accordingly, the first rib and the second rib as well as the first upright portion and the second upright portion realize a structure that doubly shuts the leaked light from the light source device when the projector is driven. Therefore, the light can be prevented from leaking to the outside of the projector via the stepped opening and the top opening.

BRIEF DESCRIPTION OF THE DRAWINGS

The invention will be described with reference to the accompanying drawings, wherein like numbers reference like elements.

FIGS. 10A and 10B are illustrations each explaining an opening/closing of the lamp cover relative to the lamp cover opening/closing portion of aforesaid embodiment.

DESCRIPTION OF EXEMPLARY EMBODIMENT(S)

An exemplary embodiment of the invention will be described below with reference to attached drawings.

1. External Appearance

Figure 1:
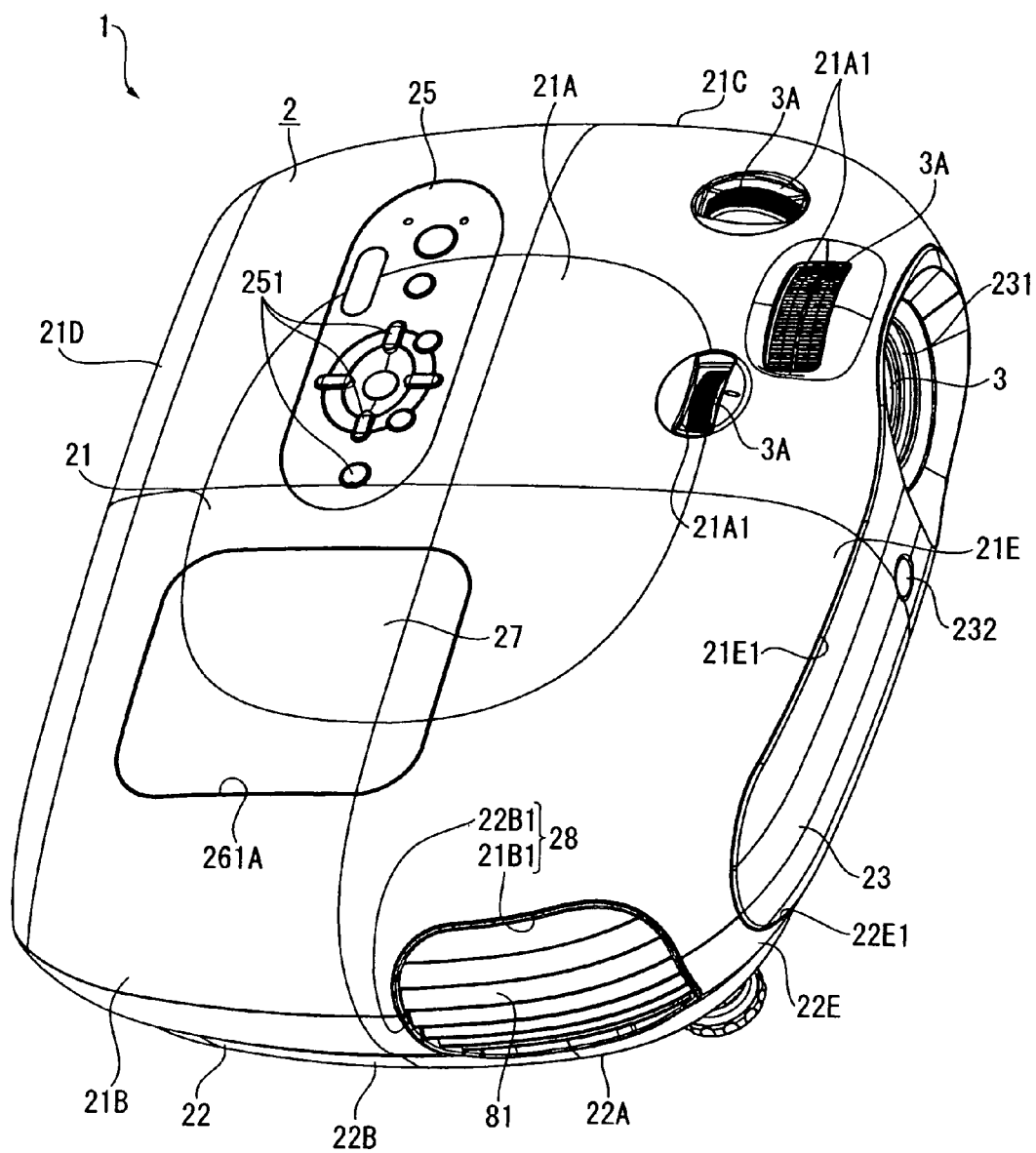
FIG. 1 is a perspective view showing an external appearance of a projector of a present exemplary embodiment.
Figure 2:
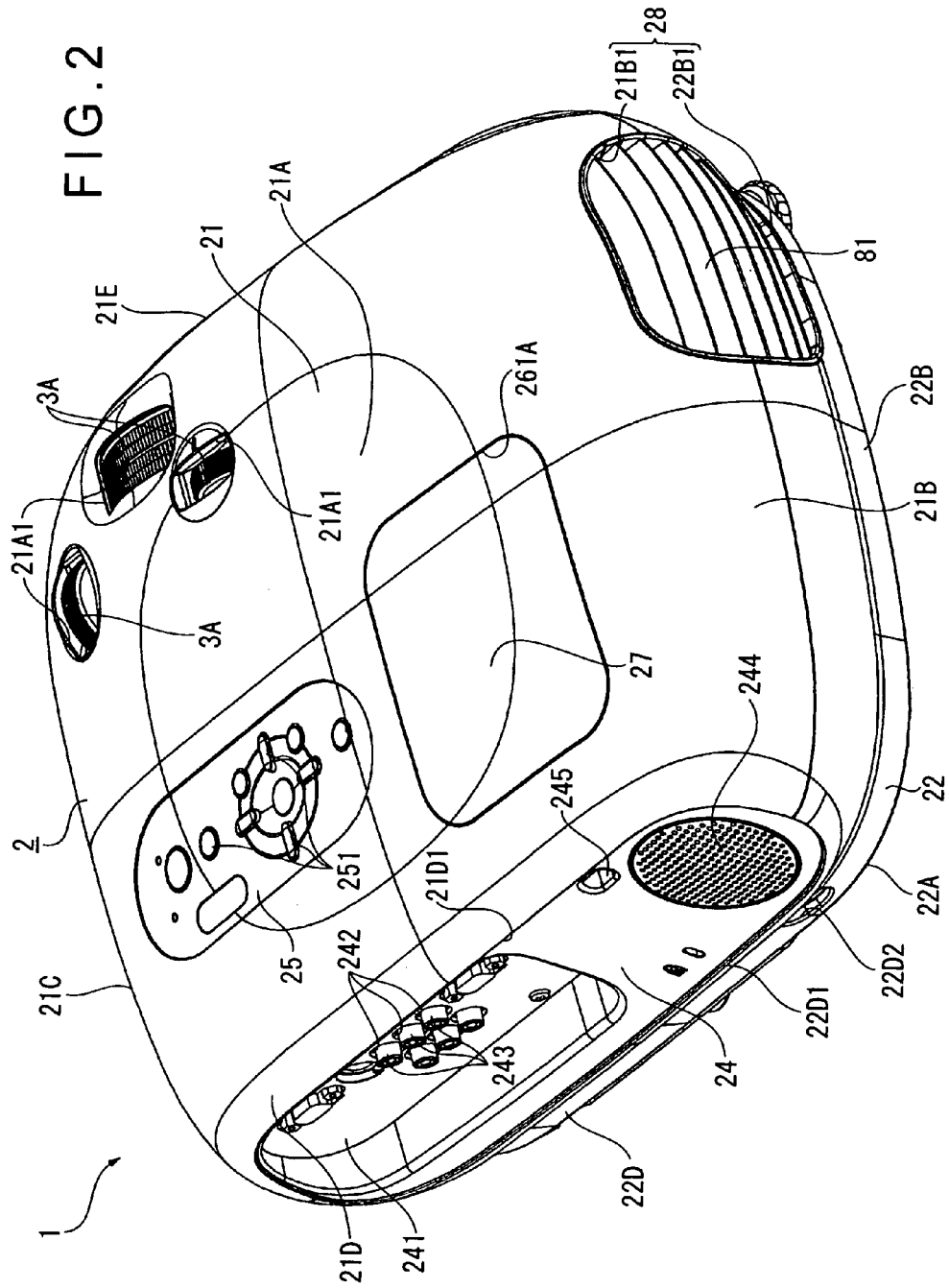
FIG. 2 is a perspective view showing the external appearance of the projector of aforesaid embodiment.

FIGS. 1 and 2 are perspective views each showing an external appearance of a projector 1. Specifically, FIG. 1 is a perspective view showing an upper front side of the projector 1. FIG. 2 is a perspective view showing an upper rear side of the projector 1.

The projector 1 modulates a light beam irradiated by a light source in accordance with image information to form an optical image, and projects the formed optical image on a screen (not shown) in an enlarged manner. As shown in FIG. 1 or 2, the projector 1 includes an exterior casing 2 substantially being rectangular parallelepiped and a projection lens 3 (FIG. 1) (projection optical device) exposed from the exterior casing 2.

The projection lens 3 is a lens set including a plurality of lenses housed in a cylindrical lens barrel, the projection lens 3 projecting the optical image modulated by the device body of the projector 1 in an enlarged manner in accordance with the image information.

The exterior casing 2 is made of synthetic resin and houses the device body of the projector 1. As shown in FIG. 1 or 2, the exterior casing 2 includes an upper case 21 covering an upper portion of the device body, a lower case 22 covering a lower portion of the device body, a front case 23 (FIG. 1) covering a front portion of the device body, and a rear case 24 (FIG. 2) covering a rear portion of the device body.

As shown in FIG. 1 or 2, the upper case 21 includes a top portion 21A, lateral portions 21B, 21C, a rear portion 21D and a front portion 21E respectively forming a top surface, a part of lateral surfaces, a part of a rear surface, and a part of a front surface of the exterior casing 2.

As shown in FIG. 1 or 2, the top portion 21A is substantially a rectangular profile in plan view and is gradually curved toward a front surface side, lateral surface sides and a rear surface side from a substantially center portion in plan view to form a curved and protruding profile.

As shown in FIG. 1 or 2, three openings 21A1 are formed in the top portion 21A on the front right side portion thereof when seen from the front. The three openings 21A1 respectively expose a part of various rotation knobs 3A that control the projection lens 3 to respectively perform focus adjustment, zoom adjustment and projection position adjustment for a projection image projected on a screen (not shown).

As shown in FIG. 1 or 2, an operation panel 25 is provided in the top portion 21A on a rear side of the openings 21A1 to extend in a horizontal direction for performing activation and adjustment of the projector 1. Pushing operation buttons 251 of the operation panel 25 causes contact with tactile switches mounted on a circuit board (not shown) disposed inside the operation buttons 251 to allow desired operations. Also a LED (Light Emitting Diode, not shown) is attached on the circuit board to emit a light corresponding to a predetermined operation.

Note that the circuit board of the above-described operation panel 25 is electrically connected to a control board (not shown), so that an operation signal generated by pressing the operation button 251 is output to the control board.

As shown in FIG. 1 or 2, a top opening 261A substantially being a rectangular profile in plan view is formed in the top portion 21A at a left side portion of the operation panel 25 when seen from the front side. Also a lamp cover 27 being a rectangular plate in plan view is detachably attached on the top portion 21A as a lid for closing the top opening 261A. By detaching the lamp cover 27 from the top portion 21A, a light source device (described later) disposed inside the exterior casing 2 can be replaced.

Note that an engagement structure of the lamp cover 27 relative to the top portion 21A will be described later.

As shown in FIG. 1 or 2, the lateral portion 21B substantially downwardly extends from an edge in a longitudinal direction of the top portion 21A, both edges in a projection direction thereof being curved toward the front side and the rear side to define a curved and protruding surface and then being connected to the rear portion 21D and the front portion 21E. Though not shown in detail, the lateral portion 21C has substantially the same profile as the lateral portion 21B.

As shown in FIG. 1 or 2, a cut portion 21B1 substantially being a U-shape in plan view is formed in the lateral portion 21B of the lateral portions 21B, 21C on the front side thereof to extend from a lower edge toward the upper side.

As shown in FIG. 2, the rear portion 21D substantially downwardly extends from an edge on the rear side in the short side direction of the top portion 21A, and a cut portion 21D1 is formed in the rear portion 21D to extend from a lower edge toward the upper side, the cut portion 21D1 substantially being a U-shape in plan view.

As shown in FIG. 1, the front portion 21E substantially downwardly extends from an edge on the front side in a short side direction of the top portion 21A, and a cut portion 21E1 is formed in the front portion 21E to extend from a lower edge to the upper side, the cut portion 21E1 substantially being a U-shape in plan view.

As shown in FIG. 1 or 2, the lower case 22 includes a bottom portion 22A, lateral portions 22B, 22C, a rear portion 22D (FIG. 2) and a front portion 22E (FIG. 1) respectively forming a bottom surface, a part of the lateral surfaces, a part of the rear surface, and a part of the front surface of the exterior casing 2.

Though not shown, the bottom portion 22A is substantially a rectangular flat surface. A plurality of legs to contact to an installation surface such as a desk, and an intake port for introducing outside cooling air to the inside of the projector 1 are formed in the bottom portion 22A.

As shown in FIG. 1 or 2, the lateral portion 22B substantially upwardly extends from both edges in the longitudinal direction of the bottom portion 22A, both edges in the projection direction thereof being curved toward the front side and the rear side to define a curved and protruding surface and then being connected to the rear portion 22D and the front portion 22E.

As shown in FIG. 1 or 2, a cut portion 22B1 is formed in the lateral portion 22B on the front left side of the lateral portion 22B when seen from the front side to extend from an upper edge toward the lower side. When the upper case 21 is assembled with the lower case 22, the cut portion 21B1 is connected to the cut portion 22B1 to form an exhaust port 28 substantially being a rectangular profile in plan view for exhausting air inside the exterior casing 2 to the outside. Also, as shown in FIG. 1 or 2, a louver 81 is attached to the exhaust port 28 for rectifying the air exhausted by an exhaust fan (not shown) disposed inside the exterior casing 2 to exhaust the heated air in the projector 1 to the outside.

As shown in FIG. 2, the rear portion 22D substantially upwardly extends from an edge on the rear side in the short side direction of the bottom portion 22A, and a cut portion 22D1 is formed in the rear portion 22D to extend from an upper edge toward the lower side, the cut portion 22D1 substantially being a U-shape in plan view. Then, the rear case 24 is supported and fixed by an inner part of the U-shape of the rear portion 21D in the upper case 21 and by an inner part of the U-shape of the rear portion 22D in the lower case 22.

As shown in FIG. 2, a rectangular opening 22D2 is formed in the rear portion 22D at the lower and right side portion when seen from the rear side, a part of that portion being recessed toward an inner side of the exterior casing 2, and the opening 22D being formed at the bottom portion of the recessed portion. Thus, an inlet connector (not shown) disposed inside is exposed via the opening 22D2, which allows outside electric power to be supplied to the device body of the projector 1.

As shown in FIG. 1, the front portion 22E substantially upwardly extends from an edge on the front side in the short side direction of the bottom portion 22A, and a cut portion 22E1 is formed in the front portion 22E to extend from an upper edge toward the lower side, the cut portion 22E1 substantially being a U-shape in plan view. Then, the front case 23 is supported and fixed by an inner part of the U-shape of the front portion 21E in the upper case 21 and by an inner part of the U-shape of the front portion 22E in the lower case 22.

As shown in FIG. 1, the front case 23 has a substantially ellipsoidal shape extending in the horizontal direction, the front case 23 closing the opening defined by the front portions 21E, 22E when the upper case 21 is connected to the lower case 22.

As shown in FIG. 1, a substantially circular opening 231 is formed in the front case 23 at the right side portion when seen from the front side, a part of that portion being recessed toward the inner side of the exterior casing 2, and the opening 231 being formed at the bottom portion of the recessed portion. The opening 231 exposes a tip end of the projection lens 3.

As shown in FIG. 1, a remote controller light-receiving window 232 is formed in the front case 23 substantially at a center portion in the longitudinal direction. A remote controller light-receiving module (not shown) that receives an operation signal from a remote controller (not shown) is disposed inside the remote controller light-receiving window 232.

Incidentally, the remote controller is provided with controls similar to the activation switch, the adjustment switch and the like provided on the above-described operation panel 25. When the remote controller is operated, an infrared ray signal corresponding to the operation is output from the remote controller, and the infrared ray signal is received by the remote controller light-receiving module via the remote controller light-receiving window 232 to be processed by the control board (not shown).

As shown in FIG. 2, the rear case 24 has substantially an ellipsoidal shape extending in the horizontal direction, the rear case 24 closing the opening defined by the rear portions 21D, 22D when the upper case 21 is connected to the lower case 22.

As shown in FIG. 2, a recess 241 substantially being a rectangular profile in plan view is formed in the rear case 24 at a left side portion when seen from the rear side to be recessed toward the inner side of the exterior casing 2.

As shown in FIG. 2, a plurality of holes 242 are formed in the recess 241, and a plurality of connector terminals 243 for inputting an image signal, an audio signal, and the like sent from external electric equipment are exposed via the plurality of holes 242. Also an interface board (not shown) for processing the signals input from the connector terminals 243 is disposed inside the rear case 24.

Incidentally, the interface board is electrically connected to the control board (not shown) and the signal processed by the interface board is output to the control board.

As shown in FIG. 2, a speaker hole 244 for outputting audio to the outside of the projector 1 is formed in the rear case 24 on the right of the recess 241 when seen from the rear side. A speaker controlled by the control board (not shown) for outputting predetermined audio is disposed inside the speaker hole 244.

In addition, as shown in FIG. 2, an operation hole 245 in communication with the inside of the exterior casing 2 for disengaging the lamp cover 27 from the top portion 21A is formed in the rear case 24 at an upper left portion of the speaker hole 244 when seen from the rear side.

2. Internal Configuration

Figure 3:
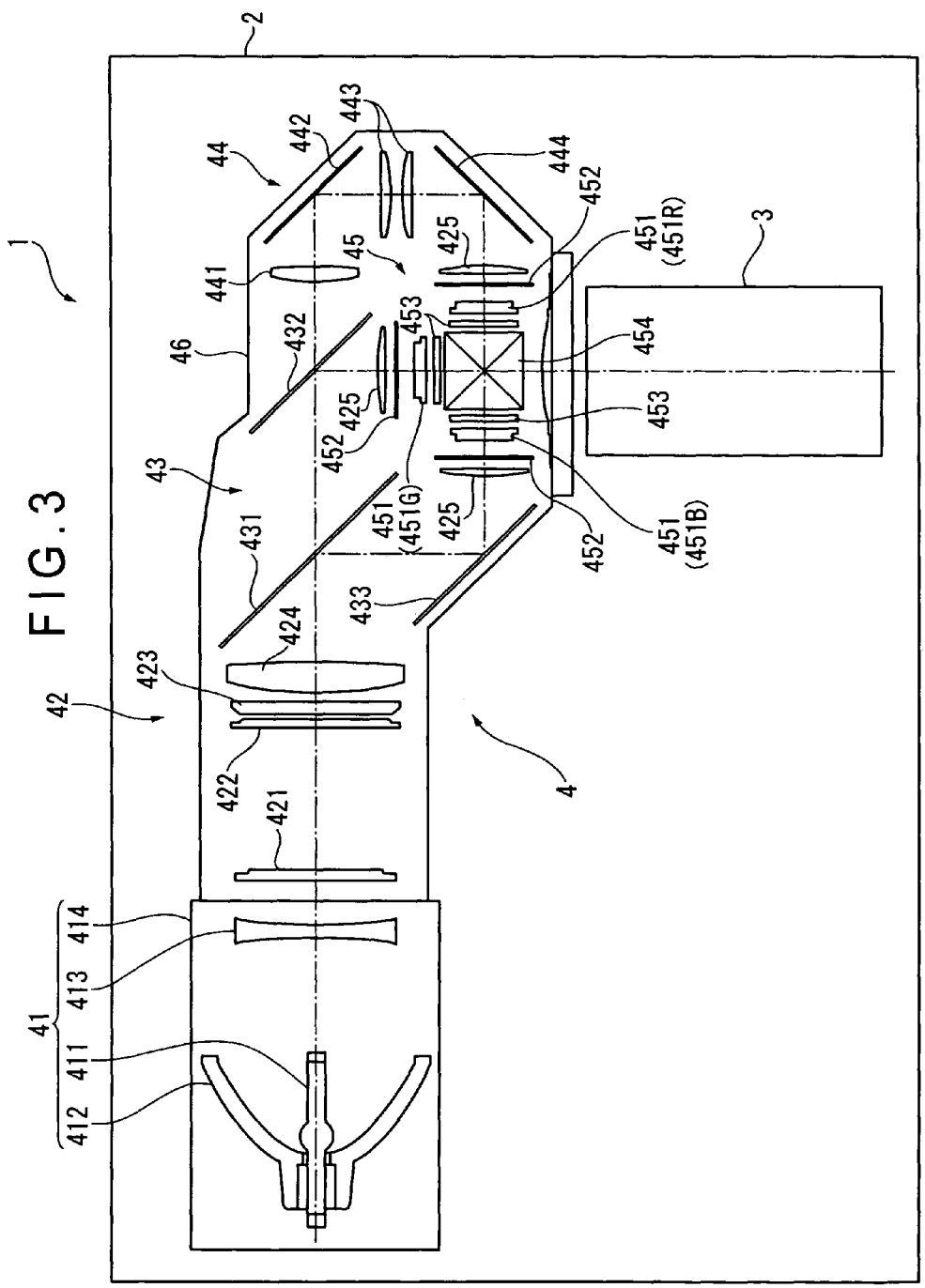
FIG. 3 is an illustration showing an internal configuration of the projector of aforesaid embodiment.

FIG. 3 is an illustration showing an internal configuration of the projector 1.

As shown in FIG. 3, the device body of the projector 1 is housed inside the exterior casing 2. The device body includes an optical unit 4 extending horizontally along the longitudinal direction of the exterior casing 2 and substantially formed in an L-shape in plan view with an end extending to the front.

Though not shown, in addition to the optical unit 4, the device body includes the control board disposed on the upper side of the optical unit 4 for entirely controlling the projector 1, a power source unit disposed at the inner portion of the L-shape of the optical unit 4 for supplying the electric power supplied from the outside to the components, a cooling unit for cooling the components inside the projector 1, and the like.

3. Detailed Arrangement of Optical Unit

The optical unit 4 forms an image light in accordance with image information under the control of the control board. As shown in FIG. 3, the optical unit 4 includes a light source device 41, an integrator illuminating optical system 42, a color-separating optical system 43, a relay optical system 44, an optical device 45 and an optical component casing 46 in which the optical components 42 to 45 are housed.

The light source device 41 lights and irradiates a parallel light to the integrator illuminating optical system 42 under the control of the control board. As shown in FIG. 3, the light source device 41 includes a light source lamp 411 as a radial light source, a reflector 412, a parallelizing concave lens 413, and a lamp housing 414 for housing the respective components 411 to 413 therein. The radial light beam irradiated by the light source lamp 411 is reflected by the reflector 412 and parallelized via the parallelizing concave lens 413 to be the parallel light. Incidentally, the light source lamp 411 may generally be a high-pressure mercury lamp, a metal halide lamp or a halogen lamp. The reflector 412 may be an ellipsoidal mirror or a parabolic mirror. When using the parabolic mirror, the parallelizing concave lens 413 can be omitted.

Though not shown in detail, the lamp housing 414 is constituted by an inner housing that supports the light source lamp 411, the reflector 412 and the parallelizing concave lens 413 and integrates the components 411 to 413, and an outer housing attached on a bottom surface portion of the lower case 22 and connected to the optical component casing 46 for detachably attaching and supporting the lamp unit, in which the components 411 to 413 are integrated by the inner housing, at a predetermined position.

When the light source device 41 is to be replaced, the lamp unit is replaced with the above-described lamp cover 27 detached from the top portion 21A.

The integrator illuminating optical system 42 is an optical system that substantially equally illuminates image formation areas of a below-described liquid crystal panel of the optical device 45 with the light beam irradiated by the light source device 41. As shown in FIG. 3, the integrator illuminating optical system 42 has a first lens array 421, a second lens array 422, a polarization converter 423 and a superposing lens 424.

The first lens array 421 has small lenses arranged in a matrix, the lenses having a substantially rectangular profile as seen in an optical axis direction. The respective lenses separate the light beam irradiated by the light source device 41 into a plurality of sub-beams.

The second lens array 422 is arranged substantially in the same manner as the first lens array 421, the second lens array 422 including small lenses arranged in a matrix. The second lens array 422 focuses the image of the small lenses of the first lens array 421 onto the liquid crystal panels (described later) of the optical device 45 together with the superposing lens 424.

The polarization converter 423 is arranged between the second lens array 422 and the superposing lens 424 for converting the light from the second lens array 422 into a substantially uniform polarized light.

Specifically, the respective sub-beams converted into the substantially uniform polarized light by the polarization converter 423 are to be substantially superposed on each of the liquid crystal panels (described later) of the optical device 45 by the superposing lens 424. Since only one-type of polarized light can be used in a projector using such liquid crystal panels that modulate a polarized light, approximately half of the light beam from the light source device 41 emitting a random polarized light cannot be used. However, by using the polarization converter 423, the light beam irradiated by the light source device 41 is converted into the uniform polarized light to enhance the light utilization efficiency of the optical device 45.

As shown in FIG. 3, the color-separating optical system 43, which has two dichroic mirrors 431 and 432, and a reflection mirror 433, separates the plurality of sub-beams irradiated from the integrator illuminating optical system 42 by the dichroic mirrors 431 and 432 into three color lights of red, green and blue.

As shown in FIG. 3, the relay optical system 44 includes an incident-side lens 441, a relay lens 443, and reflection mirrors 442, 444, the relay optical system 44 capable of guiding the red light separated by the color-separating optical system 43 toward a below-described liquid crystal panel for red light of the optical device 45.

At this time, the dichroic mirror 431 of the color-separating optical system 43 reflects the blue light component of the light beam irradiated from the integrator illuminating optical system 42 and transmits the red light component and green light component. The blue light reflected by the dichroic mirror 431 is reflected by the reflection mirror 433, which reaches a below-described liquid crystal panel for blue light of the optical device 45 through the corresponding field lens 425. The field lens 425 converts the respective sub-beams irradiated from the second lens array 422 into a light beam parallel to the central axis (main beam) thereof. The field lenses 425 provided on the light-incident side of other liquid crystal panels for green light and red light function in the same manner.

In the red and green lights transmitted through the dichroic mirror 431, the green light is reflected by the dichroic mirror 432 to reach a below-described liquid crystal panel for green light of the optical device 45 through the corresponding field lens 425. Meanwhile, the red light passes through the dichroic mirror 432 and the relay optical system 44 to reach the below-described liquid crystal panel for red light of the optical device 45 through the field lens 425. Note that the relay optical system 44 is used for the red light in order to avoid deterioration in the light utilization efficiency on account of light dispersion and the like caused by the longer length of the optical path of the red light than the optical paths of the other color lights. In other words, the relay optical system 44 is used for directly transmitting the sub-beams incident on the incident-side lens 441 to the field lens 425.

As shown in FIG. 3, the optical device 45 includes three liquid crystal panels 451 (liquid crystal panel 451R for red light, 451G for green light, and 451B for blue light), an incident-side polarization plate 452 and an irradiation-side polarization plate 453 respectively disposed on a light incident side and a light irradiation side of each liquid crystal panel 451, and a cross dichroic prism 454.

Though not shown in detail, the liquid crystal panels 451 each have a pair of transparent glass substrates with liquid crystal as electro-optic material sealed therebetween, so that an orientation of the liquid crystal is controlled according to a drive signal output from the control board for modifying a polarization direction of a polarized light irradiated by the incident-side polarization plate 452.

On the incident-side polarization plate 452, the color lights of which the polarization direction is substantially aligned to one direction by the polarization converter 423 are incident, so that only the polarized lights in the same direction as the polarization direction of the light beams aligned by the polarization converter 423 are transmitted through the incident-side polarization plate 452, and the light beams in other directions are absorbed thereby. The incident-side polarization plate 452 has a light-transmissive substrate made of sapphire glass, crystal or the like with a polarization film attached on the substrate.

The irradiation-side polarization plate 453 substantially has the same configuration as the incident-side polarization plate 452, namely, the irradiation-side polarization plate 453 passes the light beam with the polarization axis orthogonal to a transmission axis of the light beam of the incident-side polarization plate 452 (out of the light beams irradiated from the liquid crystal panel 451) and absorbs the other light beams.

The above-described liquid crystal panel 451, the incident-side polarization plate 452 and the irradiation-side polarization plate 453 constitute an optical modulator, so that the optical modulator modulates the light beam in accordance with the image information to form the optical image.

The cross dichroic prism 454 is an optical element that combines the optical image irradiated from the optical modulator and modulated for each color light to form a color image. The cross dichroic prism 454 is substantially square in plan view formed by attaching four right-angle prisms, and two dielectric multi-layer films are formed on the boundaries where the right-angle prisms are attached to each other. These dielectric multi-layer films absorb the color light irradiated by the liquid crystal panel 451G and passed through the irradiation-side polarization plate 453 and reflect the color lights irradiated by the liquid crystal panels 451R and 451B and passed through the irradiation-side polarization plates 453. Thus the color lights respectively modulated by the optical modulators are combined to form the color image.

4. Engaging Structure of Lamp Cover Relative to Top Portion

Figure 4:
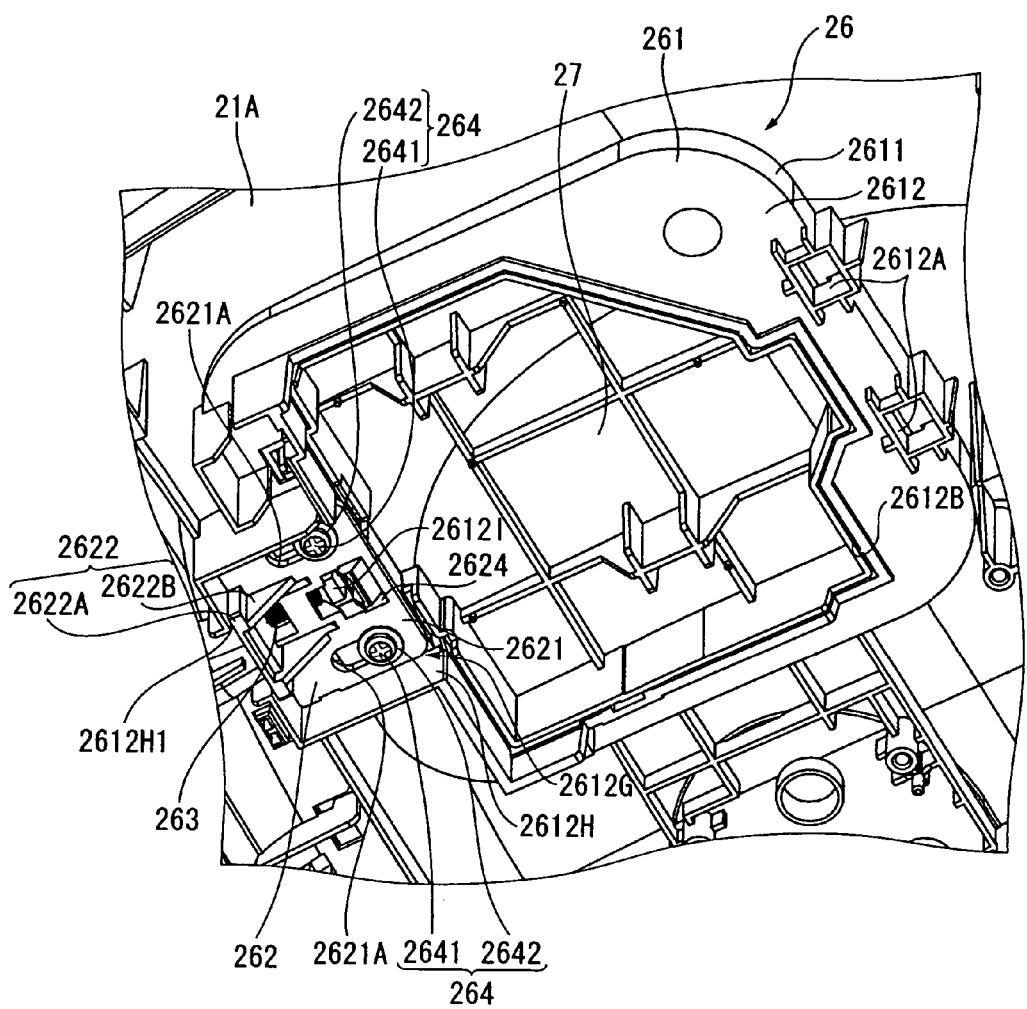
FIG. 4 is a perspective view showing an engagement structure of a lamp cover relative to a top portion of aforesaid embodiment.
Figure 5:
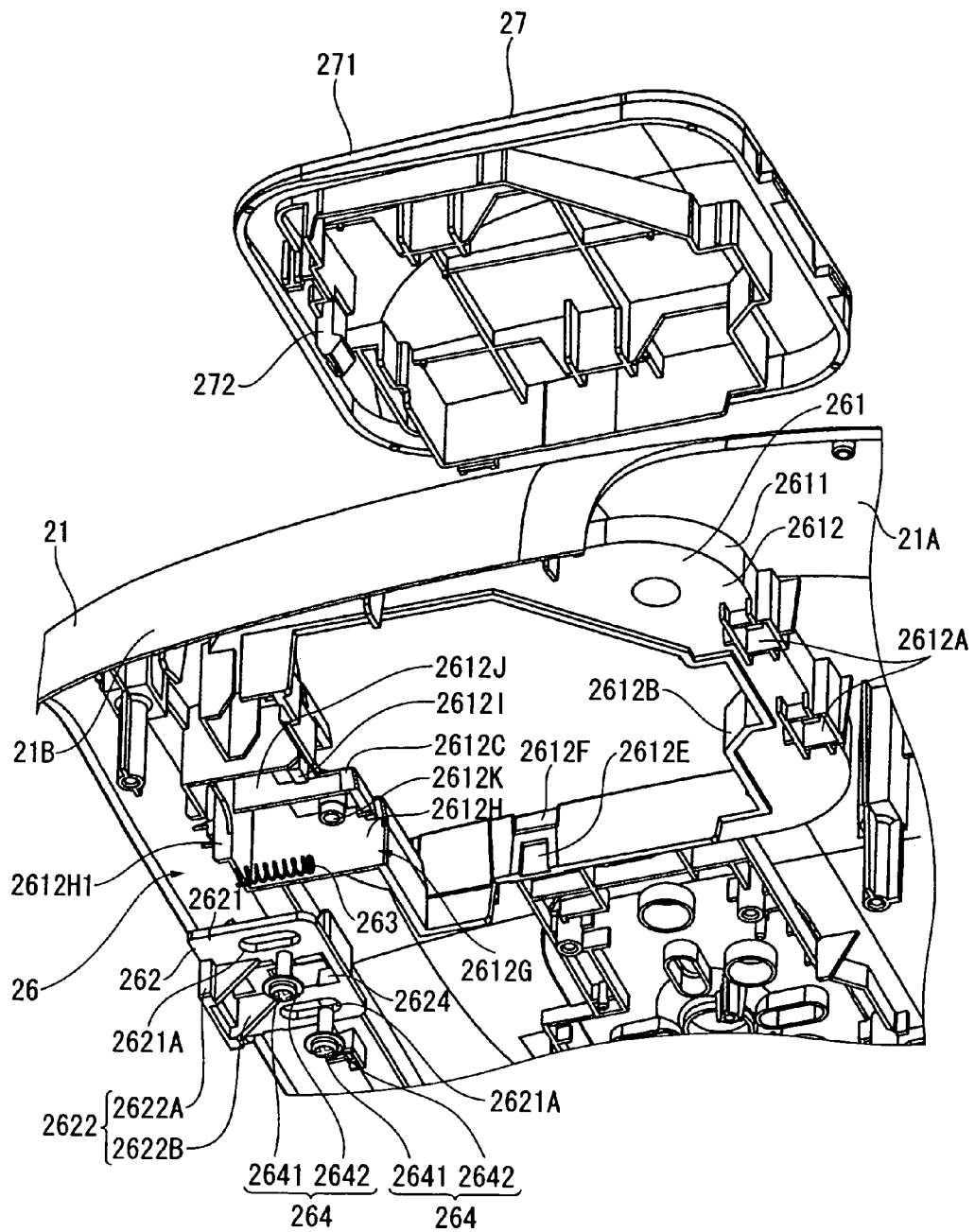
FIG. 5 is a perspective view showing the engagement structure of the lamp cover relative to the top portion of aforesaid embodiment.

FIGS. 4 and 5 are perspective views each showing an engagement structure of the lamp cover 27 relative to the top portion 21A. Specifically, FIG. 4 is an illustration seen from a back side of the top portion 21A with the lamp cover 27 being engaged relative to the top portion 21A. FIG. 5 is an exploded perspective view showing the engagement structure of the lamp cover 27 relative to the top portion 21A. Note that the left side in FIGS. 4 and 5 is the rear side of the projector 1 whereas the right side thereof is the front side of the projector 1.

As shown in FIG. 4 or 5, a lamp cover opening/closing portion 26 (lid opening/closing portion) having the top opening 261A (FIG. 1, FIG. 2) is formed at the top portion 21A, so that the lamp cover 27 is detachably attached thereto.

4-1. Configuration of Lamp Cover Opening/Closing Portion

Figure 6:
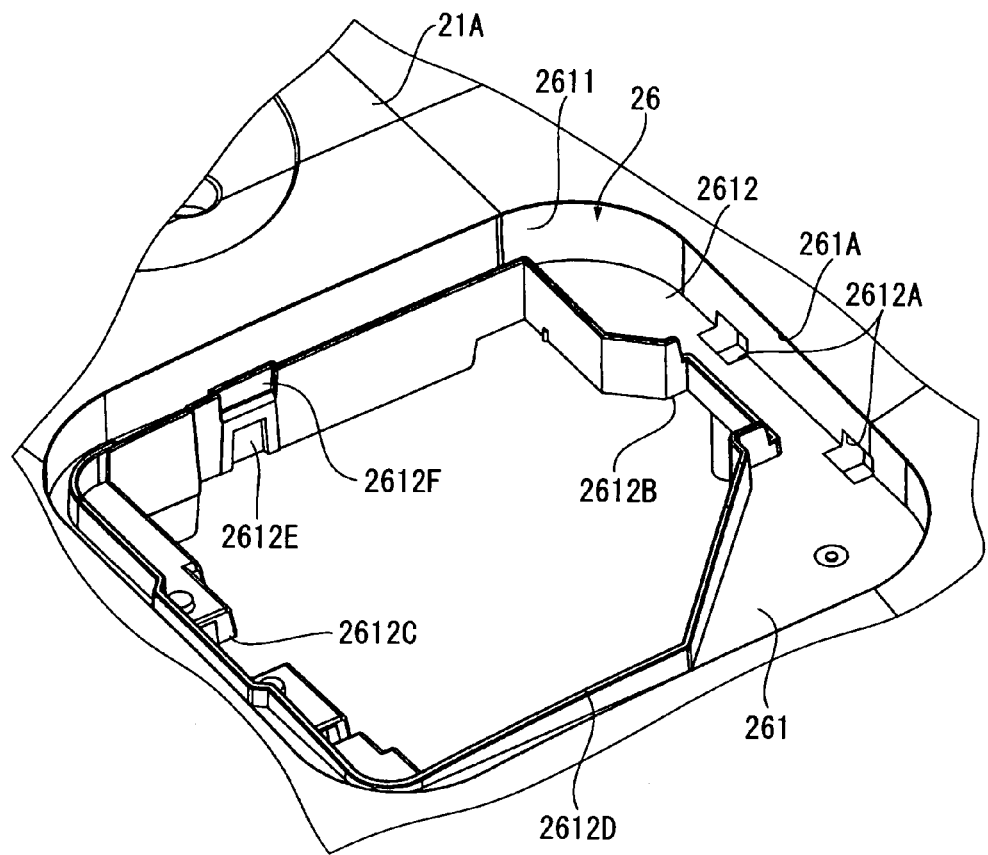
FIG. 6 is a perspective view showing an upper side of a lamp cover opening/closing portion of aforesaid embodiment.

FIG. 6 is a perspective view showing an upper side of the lamp cover opening/closing portion 26. Note that, in FIG. 6, the left side is the rear side of the projector 1 whereas the right side is the front side of the projector 1.

As shown in FIGS. 4 to 6, the lamp cover opening/closing portion 26 includes a base 261, a slider 262 (FIG. 4, FIG. 5) (engagement moving portion), a biasing member 263 (FIG. 4, FIG. 5), and a pair of fixing members 264 (FIG. 4, FIG. 5).

As shown in FIGS. 4 to 6, the base 261 is a part integrally formed with the top portion 21A and having a substantially U-shaped cross section, the base 261 including a first upright portion 2611 substantially extending from a periphery of the top opening 261A and being a rectangular frame in plan view, and a step 2612 being connected to the first upright portion 2611 and extending substantially in parallel to the top portion 21A to planarly cover the top opening 261A.

As shown in FIGS. 4 to 6, a pair of first holding recesses 2612A are formed in the step 2612 at a connecting portion with the first upright portion 2611 on the front side, the first holding recesses 2612A allowing a pair of protrusions (described later) of the lamp cover 27 to be inserted thereto. As shown in FIGS. 4 to 6, the first holding recess 2612A is formed to span both of the first upright portion 2611 and the step 2612. Owing to this, the lamp cover 27 can rotate in a vertical direction about base end portions of the pair of protrusions as supporting points with the pair of protrusions inserted to the pair of first holding recesses 2612A.

As shown in FIGS. 4 to 6, a stepped opening 2612B is formed substantially at a center portion of the step 2612, the stepped opening 2612B being a rectangular profile in plan view and having an opening area smaller than that of the top opening 261A corresponding to a planar profile of the lamp unit of the light source device 41. For replacing the light source device 41, the lamp unit is replaced via the stepped opening 2612B with the lamp cover 27 detached from the lamp cover opening/closing portion 26.

As shown in FIG. 5 or 6, a cut portion 2612C is formed in the periphery of the stepped opening 2612B substantially at a center portion thereof in the horizontal direction (longitudinal direction of the top portion 21A) on the rear side, the cut portion 2612C allowing an engaging protrusion (described below) of the lamp cover 27 to be inserted to the inside of the exterior casing 2 with the lamp cover 27 attached to the lamp cover opening/closing portion 26.

As shown in FIG. 6, a first rib 2612D being a rectangular frame in plan view is formed at the step 2612 at an end surface on the upper side, the first rib 2612D standing upwardly and surrounding the stepped opening 2612B and the cut portion 2612C.

As shown in FIG. 5 or 6, a second holding recess 2612E is formed in an inner peripheral surface of the first rib 2612D on an end surface on the left side when seen from the rear side, the second holding recess 2612E engaging with the engaging protrusion of the lamp cover 27.

As shown in FIG. 5 or 6, the second holding recess 2612E has a rectangular shape in plan view, which extends from an edge position on the lower side of the first rib 2612D toward substantially a center portion thereof in the vertical direction and is recessed in a direction away from the stepped opening 2612B.

Also as shown in FIG. 5 or 6, a recess 2612F being a rectangular profile in plan view is formed in the upper side of the second holding recess 2612E so as to inhibit the holding protrusion of the lamp cover 27 from mechanically interfering with the first rib 2612D when the lamp cover 27 is attached to the lamp cover opening/closing portion 26.

Further, as shown in FIG. 4 or 5, a slider setting portion 2612G is formed in the step 2612 on an end surface on the lower side substantially at a center portion in the horizontal direction (longitudinal direction of the top portion 21A) on the rear side, for setting the slider 262, the biasing member 263 and the fixing member 264.

As shown in FIG. 4 or 5, the slider setting portion 2612G includes a rib 2612H, a biasing member fixing portion 2612I, a pair of guides 2612J (FIG. 5) and a pair of fixing portions 2612K (FIG. 5).

The rib 2612H stands on an end surface on the lower side of the step 2612, the rib 2612H being defined by a pair of side walls extending in a cross direction (short side direction of the top portion 21A) and a rear wall connecting to the pair of side walls and extending in the horizontal direction (longitudinal direction of the top portion 21A), and surrounding the cut portion 2612C to be substantially a U-shape in plane view. The biasing member fixing portion 2612I, the pair of guides 2612J and the pair of fixing portions 2612K are formed inside the U-shape of the rib 2612H on the end surface on the lower side of the step 2612, and then the slider 262, the biasing member 263 and the fixing member 264 are disposed thereto.

As shown in FIG. 4 or 5, a cut portion 2612H1 being a U-shape in plan view is formed in the rear wall of the rib 2612H at a position confronting the operation hole 245 formed in the rear case 24, the cut portion 2612H1 extending from an edge on the lower side toward the upper side. In other words, the outside of the exterior casing 2 is in communication with the inside of the rib 2612H via the operation hole 245 and the cut portion 2612H1.

As shown in FIG. 4 or 5, the biasing member fixing portion 2612I stands on the rear side of the cut portion 2612C at the end surface on the lower side of the step 2612 to support and fix an end of the biasing member 263 by an end of the biasing member fixing portion 2612I on the rear side.

As shown in FIG. 5, the pair of guides 2612J extending in the cross direction (short side direction of the top portion 21A) stand on the end surface on the lower side of the step 2612 to sandwich the cut portion 2612C and the biasing member fixing portion 2612I in the horizontal direction (longitudinal direction of the top portion 21A). Although only one of the pair of guides 2612J is shown in FIG. 5, the other guide 2612J has the same shape.

As shown in FIG. 5, the pair of fixing portions 2612K are oppositely arranged to sandwich the pair of guides 2612J in the horizontal direction (longitudinal direction of the top portion 21A), and respectively screwed to the pair of fixing members 264. Although only one of the pair of fixing portions 2612K is shown in FIG. 5, the other fixing portion 2612K has the same shape.

Figure 7:
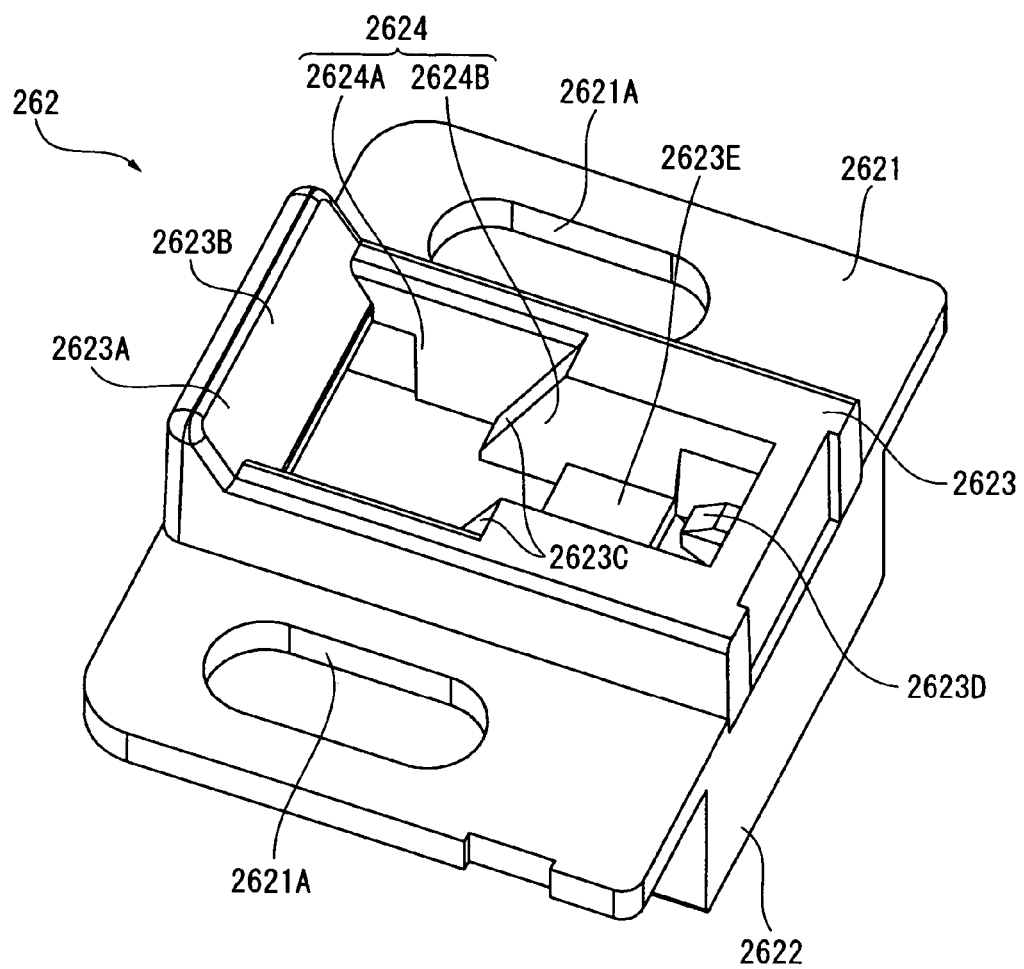
FIG. 7 is a perspective view showing a structure of a slider of aforesaid embodiment.

FIG. 7 is a perspective view showing the structure of the slider 262. Specifically, FIG. 7 is an illustration showing an upper side of the slider 262 shown in FIGS. 4 and 5. Note that, in FIG. 7, the left side is the front side of the projector 1 whereas the right side is the rear side of the projector 1.

The slider 262 is disposed inside the slider setting portion 2612G movably in the cross direction (short side direction of the top portion 21A), the slider 262 moving between an engaging position P1 (see FIG. 10A) where the slider 262 is engaged with the engaging protrusion (described below) of the lamp cover 27 and a not-engaging position P2 (see FIG. 10B) where the slider 262 is not engaged with the engaging protrusion. As shown in FIG. 4, 5 or 7, the slider 262 includes a slider body 2621 (engagement moving portion body) being a rectangular profile in plan view, a pressing portion 2622 formed on an end surface on the lower side of the slider body 2621, and a rising portion 2623 (FIG. 7) formed on an end surface on the upper side of the slider body 2621.

As shown in FIG. 4, 5 or 7, a pair of track holes 2621A extending in the cross direction (short side direction) are formed on both end portion sides in the horizontal direction (longitudinal direction) of the slider body 2621. By screwing the pair of fixing members 264 relative to the pair of fixing portions 2612K via the pair of track holes 2621A, the slider 262 is disposed inside the slider setting portion 2612G. Also, since the pair of track holes 2621A each have a shape extending in the cross direction, the track holes 2621A allow the slider 262 to be moved in the cross direction (short side direction of the slider body 2621).

The pressing portion 2622 is a part allowing the slider 262 to be moved toward the front side (toward the not-engaging position P2 side). As shown in FIG. 4 or 5, the pressing portion 2622 is constituted by a pressing portion body 2622A being a rectangular profile in plan view extending toward the lower side from an edge on the rear side of the end surface on the lower side of the slider body 2621, and a pair of support ribs 2622B each being a triangle in plan view connecting an end surface on the front side of the pressing portion body 2622A with the end surface on the lower side of the slider body 2621. By inserting a rod member such as a screwdriver to the inside of the rib 2612H from the outside of the exterior casing 2 via the operation hole 245 and the cut portion 2612H1, and by pressing the pressing portion body 2622A with a tip end of the rod member, the slider 262 is moved toward the front side (toward the not-engaging position P2 side).

As shown in FIG. 7, the rising portion 2623 is located substantially at a center portion in the horizontal direction (longitudinal direction of the slider body 2621) on the end surface on the upper side of the slider body 2621, the rising portion 2623 substantially being a rectangular parallelepiped extending in the cross direction (short side direction of the slider body 2621). While the slider 262 is arranged on the slider setting portion 2612G, both end surfaces in the horizontal direction (longitudinal direction of the slider body 2621) of the rising portion 2623 are respectively abutted on end surfaces of the pair of guides 2612J confronting thereto. Accordingly, the slider 262 is guided to move in the cross direction (short side direction of the slider body 2621) along the pair of guides 2612J.

As shown in FIG. 4, 5 or 7, a through hole 2624 being a rectangular profile in plan view is formed in the slider 262 and penetrates the end surface on the lower side of the slider body 2621 and the end surface on the upper side of the rising portion 2623.

As shown in FIG. 7, the through hole 2624 is so formed that a first through hole 2624A located on the front side and a second through hole 2624B located on the rear side are connected to each other and extend in the cross direction (short side direction of the slider body 2621). Also, as shown in FIG. 7, the through hole 2624 is so formed that a width in the horizontal direction (longitudinal direction of the slider body 2621) of the first through hole 2624A is greater than a width in the horizontal direction of the second through hole 2624B to define a stepped rectangular in plan view.

While the slider 262 is arranged in the slider setting portion 2612G, the first through hole 2624A is arranged at a position corresponding to a position of the cut portion 2612C. In other words, with the lamp cover 27 attached to the lamp cover opening/closing portion 26, the engaging protrusion (described later) of the lamp cover 27 is inserted via the cut portion 2612C and the first through hole 2624A.

In the rising portion 2623, an inner wall on the front side of the through hole 2624 is recessed toward the front side to define a hook shape at an end on the lower side thereof (see FIGS. 10A and 10B), the hook shape functioning as an engaging portion 2623A. While the lamp cover 27 is attached to the lamp cover opening/closing portion 26, the engaging protrusion (described later) of the lamp cover 27 is engaged with the engaging portion 2623A.

As shown in FIG. 7, an end surface on the upper rear side of the engaging portion 2623A defines a slant surface 2623B slanted toward the front side and extended from an edge on the lower side to an edge on the upper side thereof. That is, the slant surface 2623B defines a slant surface slanted in the moving direction (direction heading to the front side of the projector 1) of the slider 262 heading to the not-engaging position P2 as the slant surface 2623B shifts to the top portion 21A side relative to a plane orthogonal to that moving direction.

As shown in FIG. 7, a pair of steps between the first through hole 2624A and the second through hole 2624B define a slider slant surface 2623C (engagement moving portion slant) slanted on the rear side from the edge on the lower side to the edge on the upper side. That is, the slider slant surface 2623C defines a slant surface slanted in the moving direction (direction opposite to the moving direction heading to the not-engaging position P2 of the slider 262) of the slider 262 heading to the engaging position P1 as the slider slant surface 2623C shifts to the top portion 21A side relative to a plane orthogonal to that moving direction (direction heading to the rear side of the projector 1).

Further, as shown in FIG. 7, a biasing member fixing portion 2623D is formed at the rising portion 2623 on an inner wall on the rear side of the through hole 2624, the biasing member fixing portion 2623D supporting and fixing the other end of the biasing member 263. That is, with the slider 262, the biasing member 263 and the fixing member 264 arranged on the slider setting portion 2612G, the biasing member 263 is supported and fixed by the pair of biasing member fixing portions 2612I, 2623D.

Also, as shown in FIG. 7, a biasing member supporter 2623E is formed at the rising portion 2623 on an inner wall of the second through hole 2624B to span in the horizontal direction (longitudinal direction of the slider body 2621). The biasing member supporter 2623E is a part for preferably supporting the biasing member 263 relative to the pair of biasing member fixing portions 2612I, 2623D.

As shown in FIG. 4 or 5, the biasing member 263 is formed by a coil spring, an end thereof being supported by the biasing member fixing portion 2612I of the base 261 and the other end thereof being supported by the biasing member fixing portion 2623D of the slider 262. Namely, the biasing member 263 continuously biases the slider 262 toward the rear side (engaging position P1 side) relative to the base 261.

The pair of fixing members 264 are members for attaching the slider 262 inside the slider setting portion 2612G of the base 261. As shown in FIG. 4 or 5, the fixing members 264 are constituted by fixing screws 2641 being respectively screwed to the pair of fixing portions 2612K of the base 261, and washers 2642 allowing tip ends of the fixing screws 2641 to be inserted thereto and each having an external profile greater than a width of the track hole 2621A of the slider 262.

4-2. Structure of Lamp Cover

Figure 8:
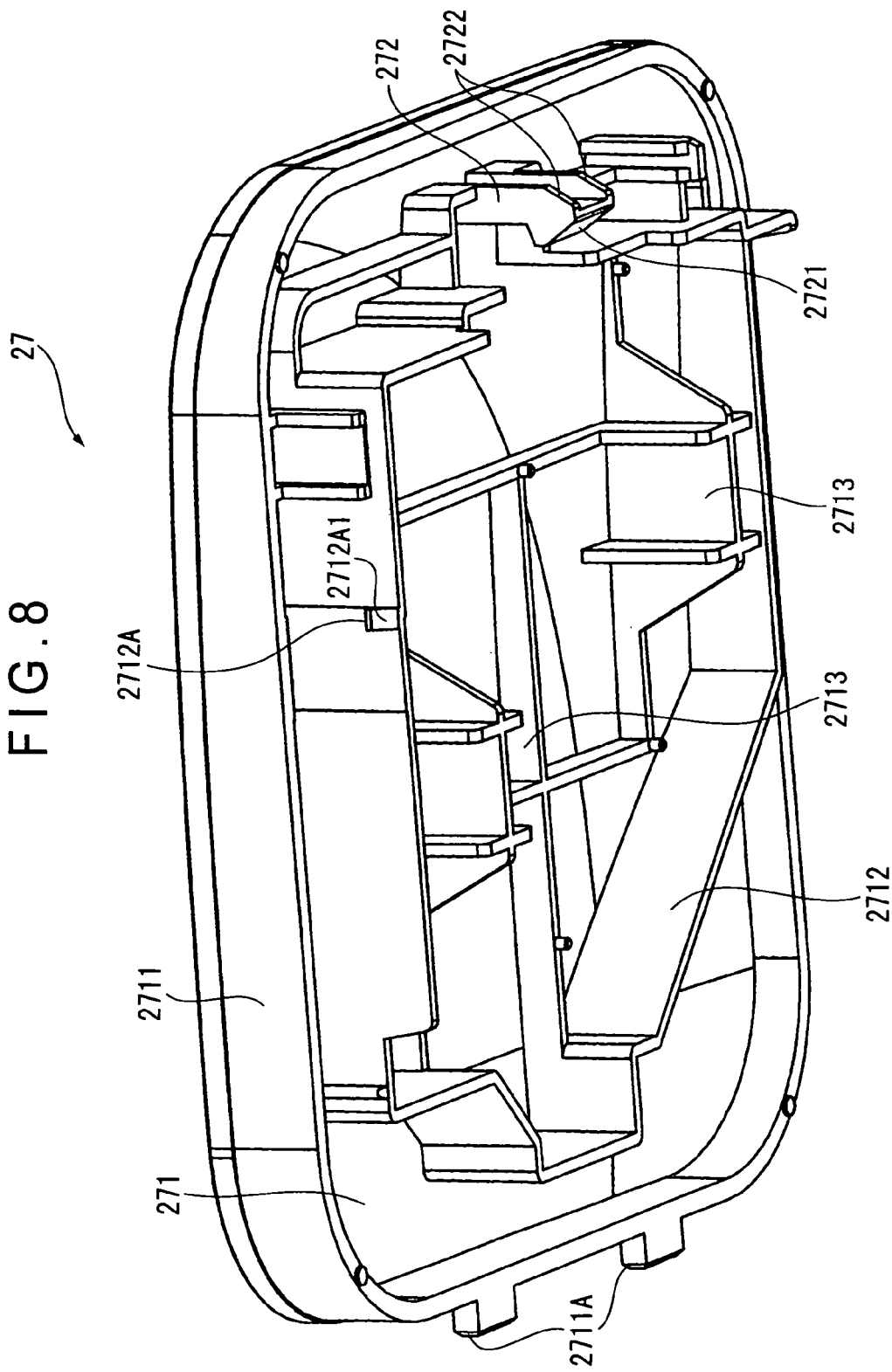
FIG. 8 is a perspective view showing a structure of the lamp cover of aforesaid embodiment.

FIG. 8 is a perspective view showing the structure of the lamp cover 27. Specifically, FIG. 8 is an illustration showing a lower side of the lamp cover 27. Note that, in FIG. 8, the left side is the front side of the projector 1 whereas the right side is the rear side of the projector 1.

As shown in FIG. 8, the lamp cover 27 is a member for closing the top opening 261A of the lamp cover opening/closing portion 26, and includes a base body 271 and an engaging protrusion 272.

As shown in FIG. 8, the base body 271 is a plate substantially being rectangular in plan view corresponding to the top opening 261A.

As shown in FIG. 8, a second upright portion 2711 substantially being a rectangular frame in plan view is formed in an end surface on the lower side of the base body 271 to extend from an outer peripheral edge to the lower side An outer peripheral surface of the second upright portion 2711 abuts on an inner peripheral surface of the first upright portion 2611 of the lamp cover opening/closing portion 26 when the lamp cover 27 is attached to the lamp cover opening/closing portion 26.

A pair of protrusions 2711A are formed on the outer peripheral surface on the front side (left side in FIG. 8) of the second upright portion 2711 to protrude toward the front side corresponding to the pair of first holding recesses 2612A of the lamp cover opening/closing portion 26. Then the pair of protrusions 2711A are inserted to the pair of first holding recesses 2612A when the lamp cover 27 is attached to the lamp cover opening/closing portion 26.

As shown in FIG. 8, a second rib 2712 substantially being a rectangular frame in plan view protruding to the lower side is formed on an end surface on the lower side of the base body 271 corresponding to the first rib 2612D of the lamp cover opening/closing portion 26. An outer peripheral surface of the second rib 2712 abuts on an inner peripheral surface of the first rib 2612D when the lamp cover 27 is attached to the lamp cover opening/closing portion 26.

As shown in FIG. 8, a holding protrusion 2712A that is engaged with the second holding recess 2612E is formed on the outer peripheral surface of the second rib 2712 at a position corresponding to a position of the second holding recess 2612E of the lamp cover opening/closing portion 26.

The holding protrusion 2712A is substantially a triangular prism having a slant surface 2712A1 slanted toward a direction away from the second rib 2712 and extending from an edge on the lower side to an edge on the upper side.

Further, a reinforcing rib 2713 for reinforcing the base body 271 is formed on an end surface on the lower side of the base body 271 on the inner side of the second rib 2712, the support rib 2713 extending in the horizontal direction and/or the cross direction.

Figure 9:
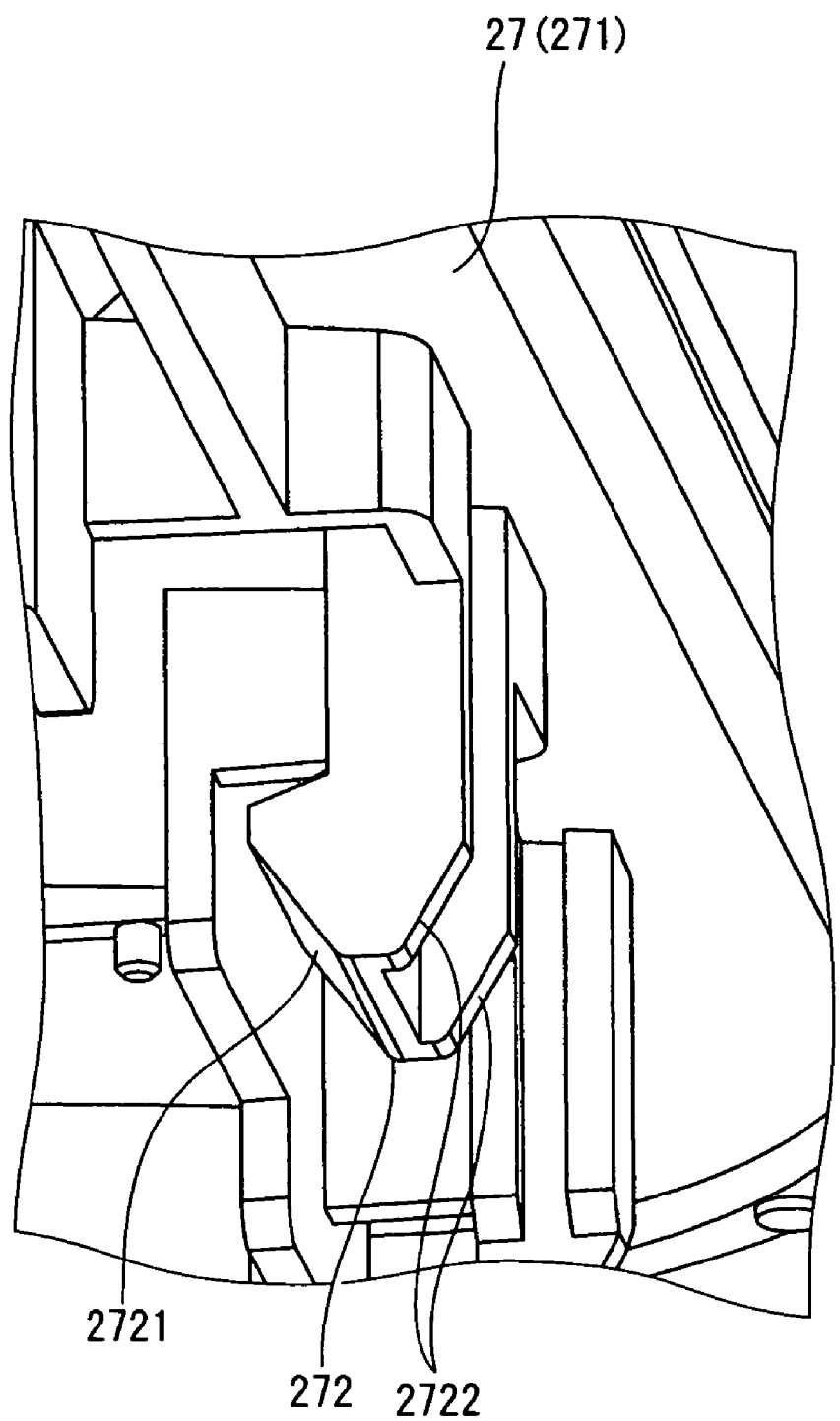
FIG. 9 is a perspective view showing a structure of an engaging protrusion of aforesaid embodiment.

FIG. 9 is a perspective view showing the structure of the engaging protrusion 272. Specifically, FIG. 9 is an illustration in which the engaging protrusion 272 shown in FIG. 8 is enlarged.

As shown in FIG. 8 or 9, the engaging protrusion 272 stands on the end surface on the lower side of the base body 271 at a position corresponding to a position of the cut portion 2612C of the lamp cover opening/closing portion 26, the engaging protrusion 272 protruding to the lower side as well as having a hook profile with a tip end in a protruding direction bent to the front side (left side in FIG. 8, FIG. 9). The engaging protrusion 272 is inserted to the cut portion 2612C and the first through hole 2624A to engage with the engaging portion 2623A of the slider 262 with the lamp cover 27 attached to the lamp cover opening/closing portion 26.

An end surface on the front side (left side in FIG. 8, FIG. 9) of the tip end of the engaging protrusion 272 defines a slant surface 2721 extending from an edge on the lower side to an edge on the upper side thereof and slanted to the front side. The slant surface 2721 is a part corresponding to the slant of the slant surface 2623B of the slider 262 and abutting on the slant surface 2623B in a sliding manner when the lamp cover 27 is attached to the lamp cover opening/closing portion 26.

An end surface on the rear side (right side in FIG. 8, FIG. 9) of the tip end of the engaging protrusion 272 defines a protrusion slant surface 2722 extending from an edge on the lower side to an edge on the upper side thereof and slanted to the rear side. The protrusion slant surface 2722 is a part corresponding to the slant of the pair of slider slant surfaces 2623C of the slider 262 and abutting on the pair of slider slant surfaces 2623C in a sliding manner when the slider 262 is moved to the front side (not-engaging position P2 side), the lamp cover 27 attached to the lamp cover opening/closing portion 26.

5. Opening/Closing of Lamp Cover

Next, an opening/closing of the lamp cover 27 relative to the above-described lamp cover opening/closing portion 26 will be described below.

Figure 11:
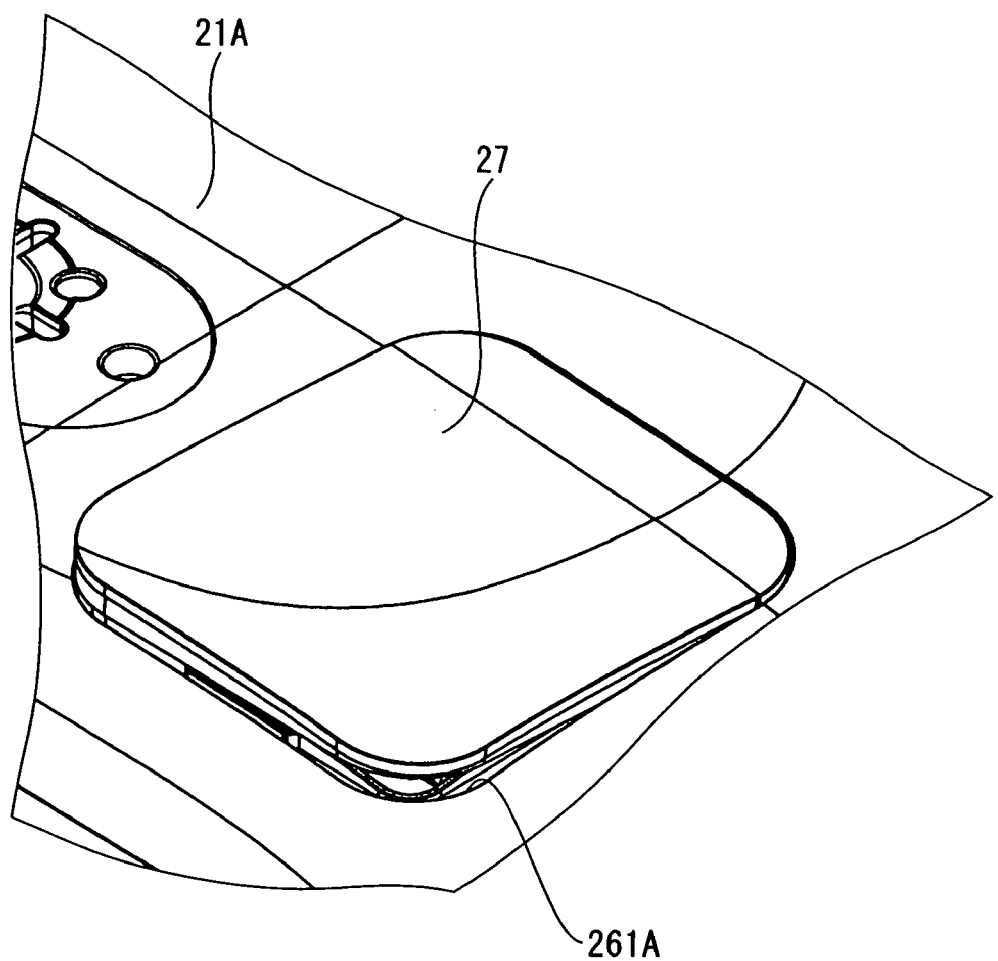
FIG. 11 is an illustration explaining the opening/closing of the lamp cover relative to the lamp cover opening/closing portion of aforesaid embodiment.

FIGS. 10A, 10B and 11 are illustrations each explaining the opening/closing of the lamp cover 27 relative to the lamp cover opening/closing portion 26. Specifically, FIG. 10A is a cross section showing a state where the lamp cover 27 is attached to the lamp cover opening/closing portion 26, namely, the engaging portion 2623A is engaged with the engaging protrusion 272. FIG. 10B is a cross section showing a state where the lamp cover 27 is detached from the lamp cover opening/closing portion 26, namely, the engaging portion 2623A is disengaged from the engaging protrusion 272. Note that, in FIGS. 10A and 10B, the left side is the rear side of the projector 1 whereas the right side is the front side of the projector 1. FIG. 11 is a perspective view showing the upper side of the projector 1 in FIG. 10B when seen from the upper side.

In the following description, attachment for attaching the lamp cover 27 relative to the lamp cover opening/closing portion 26 and detachment for detaching the lamp cover 27 from the lamp cover opening/closing portion 26 will be described in turn.

5-1. Attachment of Lamp Cover

Though not shown in detail, an operator inserts the pair of protrusions 2711A of the lamp cover 27 to the pair of first holding recesses 2612A of the lamp cover opening/closing portion 26. When the lamp cover 27 is attached, the slider 262 is positioned at the engaging position P1 by way of the biasing member 263 (for example, FIG. 10A). Owing to this, with the above-described state, the slant surface 2721 of the engaging protrusion 272 of the lamp cover 27 abuts on the slant surface 2623B of the slider 262, and the end on the rear side of the lamp cover 21A is positioned on the upper side relative to the top portion 21A and is slanted (for instance, the state in FIG. 11).

In such state, the operator presses the end on the rear side of the lamp cover 27 to the lower side, so that the slant surface 2721 of the engaging protrusion 272 is abutted on the slant surface 2623B in a sliding manner. At this time, the engaging protrusion 272 presses the slider 262 to move it to the front side (right side in FIG. 10A) against the biasing force of the biasing member 263. By keeping the pressing state of the end on the rear side of the lamp cover 27 to the lower side, the slant surface 2721 is moved to the lower side relative to the slant surface 2623B, so that the pressing state of the slider 262 is released. As shown in FIG. 10A, the slider 262 is again moved to the engaging position P1 side due to the biasing force of the biasing member 263, the engaging protrusion 272 and the engaging portion 2623A are engaged to each other, and thus the lamp cover 27 is attached relative to the lamp cover opening/closing portion 26.

5-2. Detachment of Lamp Cover

Though not shown in detail, the operator inserts the rod member such as the screwdriver from the operation hole 245 of the rear case 24 of the projector 1, so that the tip end of the rod member presses the pressing portion 2622 of the slider 262. The slider 262 is moved to the front side (right side in FIG. 10B) against the biasing force of the biasing member 263 when the pressing portion 2622 is pressed. Then the engaging protrusion 272 is disengaged from the engaging portion 2623A. By keeping the pressing state of the pressing portion 2622 and moving the slider 262 to the not-engaging position P2 (FIG. 10B) side, the pair of slider slant surfaces 2623C of the slider 262 abut on the protrusion slant surface 2722 of the engaging protrusion 272 in a sliding manner. As shown in FIG. 11, the engaging protrusion 272 is then moved to the upper side along the slider slant surface 2623C, so that the end on the rear side of the lamp cover 27 is located on the upper side relative to the top portion 21A and is slanted.

In this state, when the operator presses the end on the rear side of the lamp cover 27 to the front side as well as lifts it to the upper side, the lamp cover 27 is rotated to the upper side about base ends of the pair of protrusions 2711A as supporting points. Due to this, the lamp cover 27 is detached from the lamp cover opening/closing portion 26.

As described above, in the present exemplary embodiment, by moving the slider 262 to the rear side (engaging position P1 (FIG. 10A) side) of the projector 1 and also to the front side (not-engaging position P2 (FIG. 10B) side) of the projector 1, the lamp cover 27 is attached to/detached from the top portion 21A (lamp cover opening/closing portion 26). Owing to this, the attachment of the slider 262 to the top portion 21A alone allows the lamp cover 27 to be attached to/detached from the top portion 21A, thus facilitating its structure.

Also, the slider 262 is formed with the slider slant surface 2623C slanted in the moving direction (direction opposite to the moving direction heading to the not-engaging position P2) of the slider 262 heading to the engaging position P1 as the slider slant surface 2623C shifts to the top portion 21A side relative to a plane orthogonal to that moving direction (direction heading to the rear side of the projector 1). Accordingly, when the slider 262 is moved to the not-engaging position P2, the slider slant surface 2623C abuts on the engaging protrusion 272 of the lamp cover 27 in a sliding manner and the engaging protrusion 272 of the lamp cover 27 is pressed toward the top portion 21A side, so that the lamp cover 27 can be lifted up. Owing to this, only one member, i.e., the slider 262 alone realizes a structure in which the lamp cover 27 is disengaged from the top portion 21A (engaging portion 2623A), and the lamp cover 27 is lifted up.

Thus, the attachment/detachment of the lamp cover 27 relative to the top portion 21A is easily realized with a simple structure.

Since the protrusion slant surface 2722 corresponding to the slider slant surface 2623C is also formed on the engaging protrusion 272, when the slider 262 is moved to the not-engaging position P2, the protrusion slant surface 2722 can abut on the slider slant surface 2623C in a sliding manner, thus smoothly moving the slider 262. Accordingly, the detachment of the lamp cover 27 relative to the top portion 21A can smoothly be performed.

Also, since the lamp cover opening/closing portion 26 includes the biasing member 263 for biasing the slider 262 toward the engaging position P1, the slider 262 can continuously be biased toward the engaging position P1 side. Accordingly, since the biasing member 263 enforces the movement of the slider 262 toward the engaging position P1 side out of the two-way movement thereof toward the engaging position P1 side and toward the not-engaging position P2 side, only the movement toward the not-engaging position P2 side is required to be performed manually. Thus, when the lamp cover 27 is attached to/detached from the top portion 21A, only the movement toward the not-engaging position P2 side is required to be performed manually out of the two-way movement of the slider 262, thereby facilitating the attachment/detachment of the lamp cover 27.

Further, the pressing portion 2622 is formed on the slider 262 whereas the operation hole 245 is formed in the rear case 24 intersecting with the top portion 21A. Accordingly, by inserting the rod member such as the screwdriver to the inside of the exterior casing 2 from the outside of the exterior casing 2 via the operation hole 245, and by pressing the pressing portion 2622 by the tip end of the rod member, the slider 262 can easily be moved toward the not-engaging position P2 side.

Further, since the operation hole 245 is formed in the rear case 24, when compared to a configuration where the operation hole 245 is formed in a top portion 21A for instance, an amount of a light leaked from the light source device 41 to the outside of the projector 1 via the operation hole 245 when the projector 1 is driven can be reduced. Hence an influence on the projection image due to the leaked light can also be reduced, thus providing good viewing of the projection image for a viewer.

In addition, with the lamp cover 27 attached to the top portion 21A, the first upright portion 2611 and the first rib 2612D each being a frame in plan view of the lamp cover opening/closing portion 26 are respectively fitted to the second upright portion 2711 and the second rib 2712 each being in a frame in plan view of the lamp cover 27. Accordingly, the first rib 2612D and the second rib 2712 as well as the first upright portion 2611 and the second upright portion 2711 realize a structure that doubly shuts the leaked light from the light source device 41. Therefore, the light can be prevented from leaking to the outside of the projector 1 via the stepped opening 2612B and the top opening 261A.

Incidentally, the second holding recess 2612E is formed in the inner peripheral surface of the first rib 2612D whereas the holding protrusion 2712A is formed in the outer peripheral surface of the second rib 2712. Accordingly, the state (state shown in FIG. 11) where the slider 262 is positioned at the not-engaging position P2 and the lamp cover 27 is slightly opened relative to the top portion 21A can be supported by the hold structure of the holding protrusion 2712A and the second holding recess 2612E. Therefore, when the projector 1 is in a suspended posture (for example, a state where a bottom surface of the projector 1 is attached to an installation surface such as a ceiling), for moving the slider 262 to the not-engaging position P2 and detaching the lamp cover 27 from the top portion 21A, the lamp cover 27 will not be dropped and the detachment of the lamp cover 27 can preferably be performed.

Also, since the hold structure is formed on the first rib 2612D and the second rib 2712, the first rib 2612D and the second rib 2712 can shut the leaked light as described above. Therefore, the amount of the light leaked to the outside of the projector 1 via the hold structure can be reduced, for instance, when compared to a structure where a holding protrusion is provided on the lamp cover 27 and a hole which engages with the holding protrusion is formed in the step 2612.

It is to be understood that the invention is not limited to the above-described exemplary embodiment, and includes modifications and improvements without departing from the scope of the invention.

In the exemplary embodiment, although the slider 262 (engagement moving portion) is moved to the rear side (engaging position P1 side) of the projector 1 and to the front side (not-engaging position P2 side) of the projector 1 as a structure for allowing the lamp cover 27 to be attached to/detached from the top portion 21A, it is not limited thereto. For example, the engagement moving portion can be moved in the horizontal direction (longitudinal direction of the top portion 21A) instead of in the cross direction. Also, the engagement moving portion may not be moved in a sliding manner as described in the exemplary embodiment, but may be rotated between the engaging position and the not-engaging position.

In the exemplary embodiment, although the operation hole 245 is formed in the rear case 24, which is the lateral portion intersecting with the top portion 21A, it is not limited thereto. An operation hole may be formed in the lateral portion corresponding to a sliding direction or a rotating direction of the engagement moving portion. For example, an operation hole may be formed in the lateral portions 21B, 21C or in the front case 23.

In the exemplary embodiment, although the lamp cover opening/closing portion 26 is provided with the base 261 to which the slider 262 is attached, it is not limited thereto. The slider 262 may be directly attached to the back surface of the top portion 21A without the base 261.

The structure of the slider 262 and the structure of the slider setting portion 2612G for arranging the slider 262 are not limited to those described in the exemplary embodiment, and other structure may be employed.

In the exemplary embodiment, since the hold structure (the holding protrusion 2712A and the second holding recess 2612E) is formed at the first rib 2612D and the second rib 2712, it is not limited thereto, and the hold structure may be formed at the first upright portion 2611 and the second upright portion 2711. Also, the positions of forming the holding protrusion and the second holding recess are not limited to the positions described in the exemplary embodiment, and for instance, a holding protrusion may be formed at the first rib 2612D or the first upright portion 2611, and a second holding recess may be formed at each of the second rib 2712 or the second upright portion 2711.

In the exemplary embodiment, although the transmissive liquid crystal panel 451 is employed as the optical modulator, it is not limited thereto, and a reflective liquid crystal panel may be employed, or a Digital Micro-mirror Device (DMD™; Texas Instruments Incorporated) may be employed. When the Digital Micro-mirror Device is employed, the incident-side polarization plate 452 and the irradiation-side polarization plate 453 will not be required.

In the above exemplary embodiment, although a front-type projector that projects an image in a direction for observing a screen is taken as an example, the invention may be applied to a rear-type projector that projects an image in a direction opposite to the direction for observing the screen.

Although the best configuration for implementing the invention is disclosed above, the invention is not restricted thereto. That is, the invention is mainly illustrated and described on the specific embodiment, however, a person skilled in the art can modify the specific configuration such as shape, material, quantity on the above-described embodiment as long as a technical idea and an object of the invention can be achieved.

Therefore, the description that limits the shape and the material is only the example to make the invention easily understood, but does not intend to limit the invention, so that the invention includes the description using a name of component without a part of or all of the limitation on the shape and the material etc.

The projector of the invention is applicable to a projector used for a presentation or a home theater because the projector realizes attachment/detachment of a lid relative to an exterior casing easily with a simple structure.

What is claimed is:

1. A projector, comprising:
   a light source device; and
   an exterior casing for housing the light source device, wherein
   the projector modulates a light beam irradiated by the light source device to project the light beam in an enlarged manner,
   the exterior casing includes:
   a top portion;
   a top opening formed in the top portion at a position corresponding to a position of the light source device;
   a lid capable of closing the top opening;
   a lid opening/closing portion for detachably attaching the lid relative to the top portion; and
   an engaging protrusion formed at the lid, the engaging protrusion projecting to an inside of the exterior casing via the top opening with the lid attached relative to the top opening,
   the lid opening/closing portion includes an engagement moving portion attached on a back surface of the top portion, the engagement moving portion having an engaging portion to be engaged with the engaging protrusion and being movable between an engaging position where the engaging portion engages with the engaging protrusion and a not-engaging position where the engaging portion does not engage with the engaging protrusion,
   the engagement moving portion includes an engagement moving portion slant surface, the engagement moving portion slant surface abutting on the engaging protrusion in a sliding manner when the engagement moving portion is moved to the not-engaging position to press the engaging protrusion toward the top portion, the engagement moving portion slant surface being provided at a position opposed to the engaging portion with the engaging protrusion being interposed therebetween when the engagement moving portion is located at the engaging position, the lid opening/closing portion has a base formed on a peripheral edge of the top opening of the top portion for attaching the engagement moving portion thereto, a first rib being formed on the base and protruding in a direction substantially orthogonal to the top portion, a second rib being formed on a back surface of the lid, the second rib protruding in a direction substantially orthogonal to the lid and fitting to the first rib with the lid attached relative to the top portion, and a hold structure being formed at each of the first rib and the second rib for holding a moving position of the lid relative to the top portion with the engagement moving portion positioned at the not-engaging position.

2. The projector according to claim 1, wherein a protrusion slant surface is formed at the engaging protrusion, the protrusion slant surface abutting on the engagement moving portion slant surface in a sliding manner corresponding to the engagement moving portion slant surface.

3. The projector according to claim 1, wherein the lid opening/closing portion is disposed between the top portion and the engagement moving portion, and has a biasing member for biasing the engagement moving portion toward an engaging position side.

4. The projector according to claim 1, wherein the engagement moving portion has an engagement moving portion body which is a plate substantially parallel to the top portion, and a pressing portion standing on a plate surface of the engagement moving portion body and being substantially orthogonal to a moving direction of the engagement moving portion, and an operation hole to move the engagement moving portion to the not-engaging position is formed in a lateral portion intersecting with the top portion of the exterior casing at a position planarly interfering with the pressing portion.

5. The projector according to claim 1, wherein the base includes a first upright portion protruding from a peripheral edge of the top opening to an inside of the exterior casing, and a step connecting to the first upright portion, planarly covering the top opening and extending substantially parallel to the top portion, the step has a stepped opening formed at a position corresponding to a position of the light source device and having an opening area smaller than an opening area of the top opening, and the first rib covering the stepped opening, and a second upright portion formed on the back surface of the lid, the second upright portion protruding in a direction substantially orthogonal to the lid, and the second upright portion and the second rib respectively fitting to the first upright portion and the first rib with the lid attached relative to the top portion.

* * * * *